Patented Sept. 5, 1939

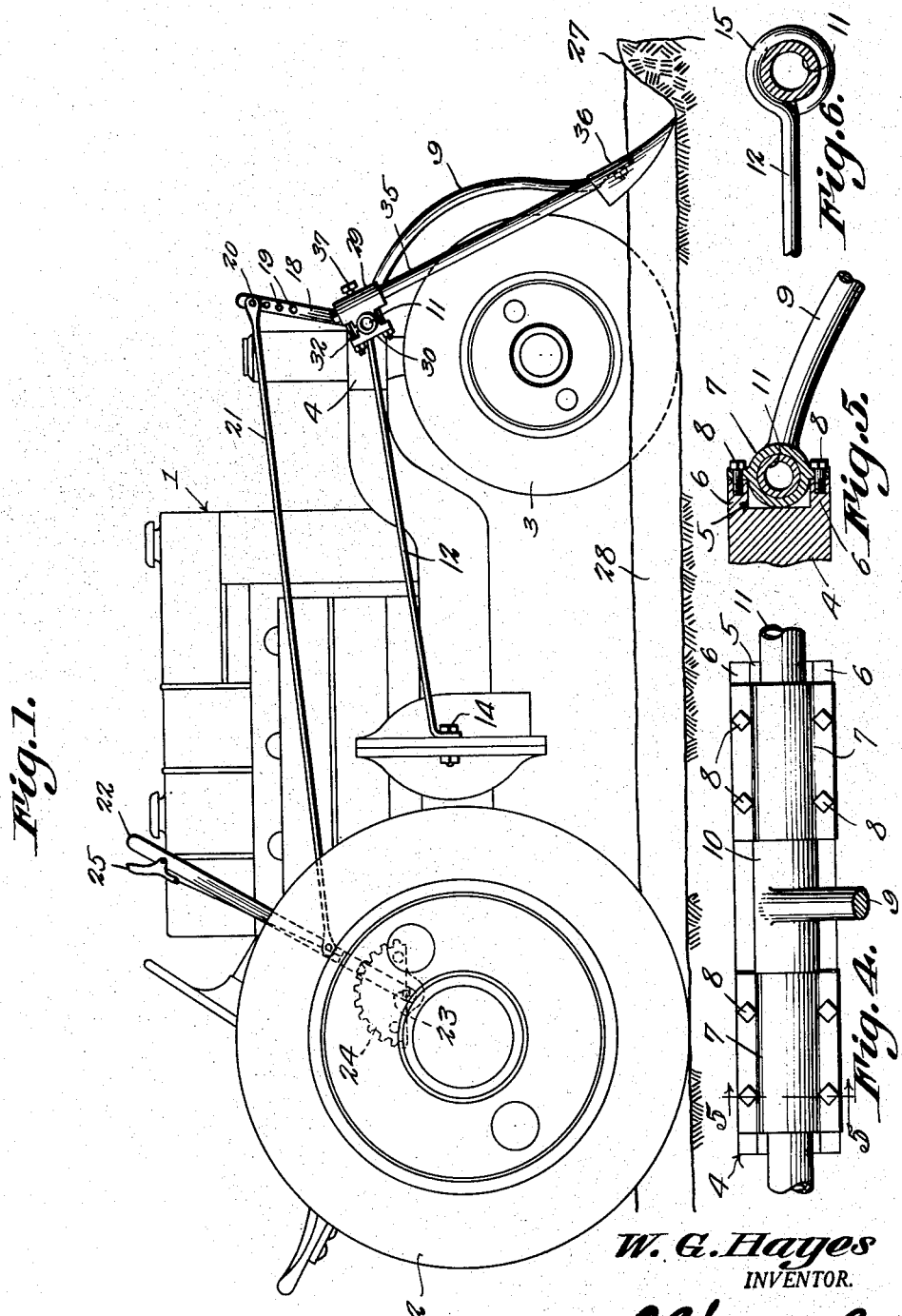

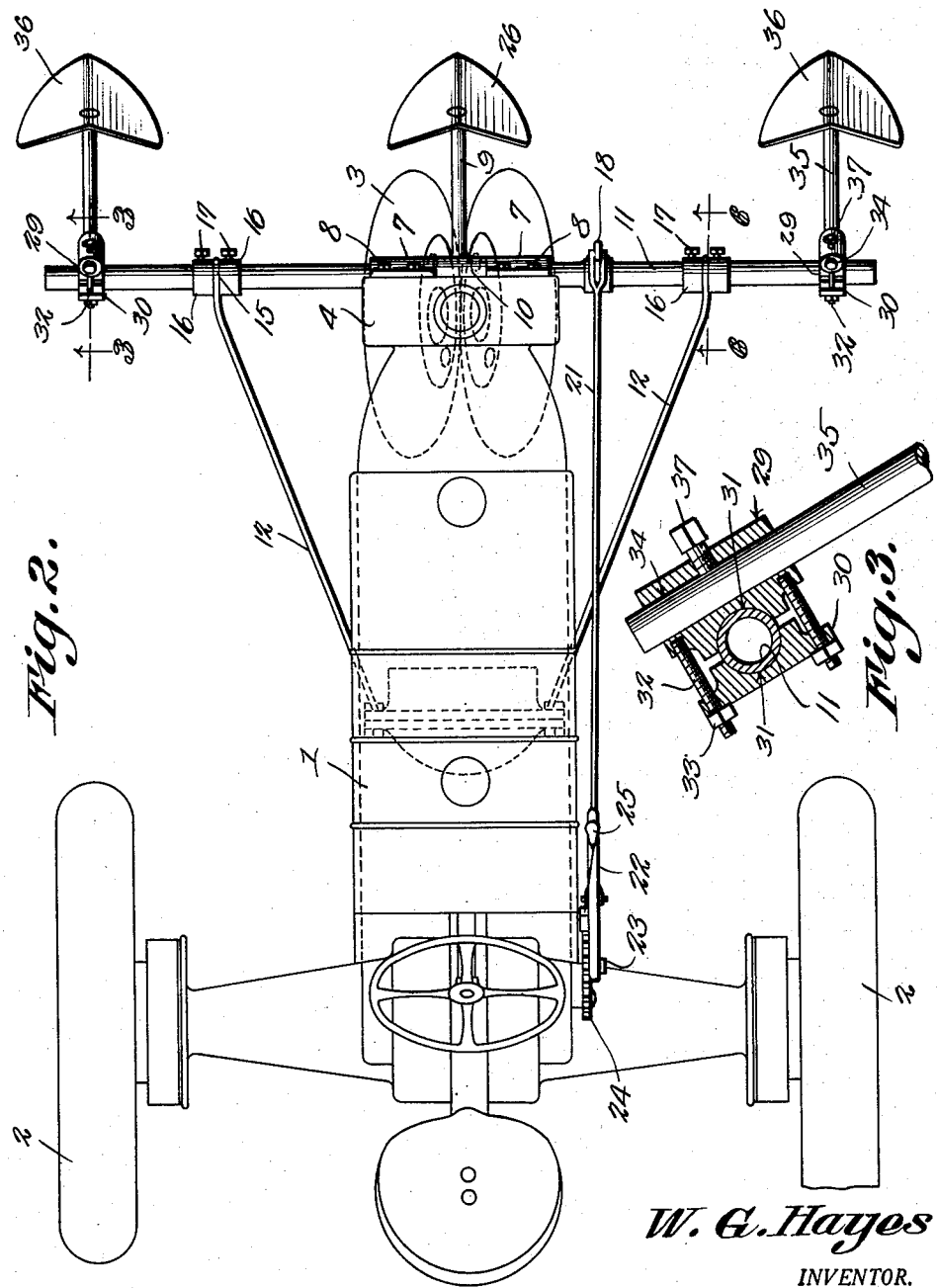

2,171,830

UNITED STATES PATENT OFFICE 2,171,830

DAM REMOVER

William G. Hayes, Granite, Okla.

Application September 26, 1938, Serial No. 231,827

5 Claims. (Cl. 97—47)

Present knowledge of soil tilling makes unnecessary an argument in support of placing dirt dams in furrows, but after they have served their purpose, they should be removed. The dams tilt the listing tractor, gaps exist where no seed is sown, or is sown improperly, seed is wasted, and the driver of the tractor receives a shaking up that exceeds mere physical discomfort.

This invention aims to provide means for clearing away the dams, ahead of a tractor, to provide a novel curved shovel standard that enables one shovel to work ahead of the forward wheels of a tractor, regardless of the actual construction of those wheels and regardless of the precise construction of the tractor, to provide the necessary adjustments, and to combine strength and simplicity of structure with facility in operation.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:

Fig. 1 shows, in side elevation, a tractor equipped with the device forming the subject matter of this application;

Fig. 2 is a top plan;

Fig. 3 is a sectional view showing the means for mounting the shovel standards for adjustment transversely of the actuating shaft and longitudinally of that shaft;

Fig. 4 is an elevation illustrating the mounting of the shaft, especially as regards the standard of the middle shovel;

Fig. 5 is a section on the line 5—5 of Fig. 4;

Fig. 6 is a section showing the connection between the braces and the main or actuating shaft of the machine.

The numeral 1 marks a tractor, having rear ground wheels 2, located on opposite sides of the longitudinal center of the tractor, and spaced at considerable distance from the longitudinal center of the tractor. The tractor 1 has one or more front wheels 3, located in, or close to the longitudinal center of the tractor. The forward frame beam of the tractor is marked by the numeral 4 and has a front recess 5 between its flanges 6.

Transversely spaced bearings 7 are secured at 8 to the flanges 6 of the tractor beam 4 and are located on opposite sides of the longitudinal central line of the tractor, but closely adjacent thereto. A forwardly curved standard 9 is provided, and is equipped at its upper end with an elongated collar 10, fitting closely between the bearings 7, the collar being secured, by welding or otherwise, to a transverse main or actuating shaft 11, which may be tubular, the shaft being mounted for rocking movement in the bearings 7, the bearings extending backwardly into the recess 5 in the beam 4, as Fig. 5 will show. Since the collar 10 is received closely between the bearings 7, endwise movement of the shaft 11 is prevented.

Figure 2 shows that the ends of the shaft 11 extend a considerable distance, outwardly, beyond the sides of the tractor body. In order to sustain the end portions of the shaft 11 against backward thrust, rearwardly converging braces 12 are supplied, the rear ends of the braces being securely connected at 14 to any rigid portion of the tractor that may be accessible. At their forward ends, the braces 12 have eyes 15, receiving the shaft 11. Collars 16 are secured by set screws 17 to the shaft 11, and the eyes 15 of the braces 12 are received between the collars 16 closely, to prevent a spreading apart of the braces 12, the collars 16, however, in nowise interfering with the rocking movement of the shaft 11.

In order to provide for a rocking movement of the shaft 11, an upstanding arm 18 is secured to the shaft, a little to one side of the body of the tractor, as depicted in Figs. 1 and 2. The arm 18 has a plurality of longitudinally spaced openings 19, adapted to receive a pivot element 20, carried by the forward end of a rearwardly extended link 21, pivoted to a hand lever 22, fulcrumed at 23 on a segment 24 secured to the tractor 1, the lever carrying a latch mechanism 25, cooperating with the segment. For simplicity of disclosure, the part 22 has been shown as a hand lever, but no specific illustration is required to support the statement that the lever 22 might be operated by power, if desired.

The curved middle standard 9 is one of the important features of the invention. It carries, at its lower end, a shovel 26, and owing to the curved form of the standard 9, the shovel 26 always can be located directly in front of the forward wheels 3, regardless of the construction of the tractor or of the wheels, and the shovel 26 can be given such an inclination that it will be found thoroughly effective to clear away the dam 27 in the furrow 28 of Fig. 1.

Figures 3 and 2 show that clamps are mounted on the end portions of the shaft 11. The clamp comprises a forward member 29 and a rear member 30, the members 29 and 30 of the clamp being recessed at 31, so that they will conform properly to the shaft 11. Any suitable means may be supplied for holding the clamp members 29 and 30 on the shaft 11. If desired, the clamp member 29 may carry threaded studs 32, received slidably in the clamp member 30, and provided with nuts 33, engaging the clamp member 30. The forward member 29 of each clamp is supplied with a bore 34, disposed transversely of the shaft 11, and adapted to receive the straight standards 35 of shovels 36, set screws 37 being threaded into the forward members 29 of the clamps, for engagement with the standards 35.

Noting Fig. 3 of the drawings, it will be obvious that by slacking away the nuts 33, the clamps or holding devices 29 or 30 may be adjusted circumferentially of the shaft 11, thereby to raise or lower, as occasion may require, the shovels 36. When the nuts 33 are slacked away, the clamps 29—30 may be adjusted longitudinally of the shaft 11, and the shovels 36 may be so placed that they will operate immediately in front of the rear ground wheels 2 of the tractor 1, the device thus being made readily adaptable to tractors having different distances between the rear ground wheels 2.

By loosening the set screws 37, the standards 35 can be adjusted up and down, thereby to adjust the shovels 36, vertically, with respect to the dams which are to be removed.

The general operation of the device may be dismissed with a brief statement. The shovels 36 and 26 are adjusted vertically, with respect to the dams 27, and they can be turned up into an out of the way position, by parts including the standards 9 and 35, the clamps 29—30, the shaft 11, the crank arm 18, the link 21 and the lever 22, it being recalled that the lever can be operated in any appropriate way, either by hand or by power.

The device will be found thoroughly effective for consummating the objects set forth in the opening portion of this specification. All parts are readily visible, readily adjustable and readily operated. The structure will accommodate itself to any make of tractor, and this statement is particularly true, in view of the forwardly curved arm 9 of the shovel 26, the said arm clearing the front wheels 3, regardless of their construction, and giving the shovel 26 the proper slant with respect to the dam 27 which is to be removed.

Having thus described the invention, what is claimed is:

1. In a dam remover, a substantially horizontal shaft, a forwardly curved standard having its upper portion mounted on the shaft, a soil-engaging dam displacer carried by the lower portion of the standard, means for mounting the shaft for rocking movement on the forward portion of a tractor, with the dam displacer adjacent to the central longitudinal line of the tractor and directly ahead of the forward wheel means of the tractor, the forward curve of the standard adapting it to the forward wheel means of the tractor and giving the dam displacer effective relation with respect to the dam to be displaced, and means for rocking the shaft.

2. In a dam remover, a substantially horizontal shaft, a forwardly curved standard having its upper portion mounted on the intermediate part of the shaft, a first dam displacer carried by the lower portion of the standard, holding devices on the end parts of the shaft, other standards carried by the holding devices, second dam displacers on the lower portions of said other standards, means for mounting the shaft for rocking movement on the forward portion of a tractor, with the first dam displacer adjacent to the central longitudinal line of the tractor and directly ahead of the forward wheel means of the tractor, and with the second dam displacers directly ahead of the rear wheels of the tractor, the forward curve of the first specified standard adapting it to the forward wheel means of the tractor, and means for rocking the shaft.

3. A dam remover constructed in accordance with claim 2, and wherein the holding devices embody means for retaining them and the corresponding standards and dam displacers in adjusted positions circumferentially of the shaft.

4. A dam remover constructed as set forth in claim 2, the holding devices embodying means whereby the corresponding standards and the corresponding dam displacers may be adjusted in a general vertical direction.

5. A dam remover constructed as set forth in claim 2, in combination with rearwardly converging braces, means for securing the rear ends of the braces to a tractor, the shaft being rotatably mounted in the forward portions of the braces, and means for holding the forward portions of the braces against shifting movement longitudinally of the end portions of the shaft.

WILLIAM G. HAYES.